United States Patent
Yamaji

(10) Patent No.: US 9,372,763 B2
(45) Date of Patent: Jun. 21, 2016

(54) STORAGE CONTROL DEVICE AND STORAGE CONTROL METHOD

(71) Applicant: FUJITSU LIMITED, Kawasaki-shi, Kanagawa (JP)

(72) Inventor: Kazufumi Yamaji, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 166 days.

(21) Appl. No.: 14/187,634

(22) Filed: Feb. 24, 2014

(65) Prior Publication Data
US 2014/0298089 A1 Oct. 2, 2014

(30) Foreign Application Priority Data
Mar. 29, 2013 (JP) .................................. 2013-074770

(51) Int. Cl.
*G06F 11/00* (2006.01)
*G06F 11/14* (2006.01)
*G11B 19/04* (2006.01)

(52) U.S. Cl.
CPC .......... *G06F 11/1469* (2013.01); *G11B 19/041* (2013.01)

(58) Field of Classification Search
CPC .............................................. G06F 2212/7211
See application file for complete search history.

(56) References Cited

U.S. PATENT DOCUMENTS

| 6,230,233 | B1* | 5/2001 | Lofgren | G06F 12/0246 365/185.3 |
| 7,467,274 | B2* | 12/2008 | Neufeld | G06F 3/0601 707/999.202 |
| 7,694,066 | B2* | 4/2010 | Sakui | G06F 12/0246 711/103 |
| 8,406,104 | B1* | 3/2013 | Himi | G11B 27/36 369/47.1 |
| 8,898,373 | B1* | 11/2014 | Kang | G06F 12/0246 711/103 |
| 2005/0262400 | A1 | 11/2005 | Nadeau et al. | |
| 2007/0211363 | A1 | 9/2007 | Nagashima et al. | |
| 2010/0115183 | A1* | 5/2010 | Araki | G06F 12/0246 711/103 |
| 2010/0321817 | A1* | 12/2010 | Aida | G11B 5/09 360/60 |
| 2012/0002315 | A1 | 1/2012 | Inoue | |

FOREIGN PATENT DOCUMENTS

| JP | 2005/322399 | 11/2005 |
| JP | 2007/242207 | 9/2007 |
| JP | 2012/014790 | 1/2012 |

* cited by examiner

*Primary Examiner* — Christopher McCarthy
(74) *Attorney, Agent, or Firm* — Staas & Halsey LLP

(57) ABSTRACT

A storage control device includes a processor. The processor is configured to request a plurality of disk devices storing data therein to notify the processor of degradation information on degradation of data stored in the respective disk devices. The processor is configured to instruct, based on first information among notified degradation information, the plurality of disk devices to rewrite data. The first information serves as a trigger of rewriting data. The first information is notified by at least one of the plurality of disk devices.

15 Claims, 6 Drawing Sheets

FIG. 4

| GROUP | RAID LEVEL | TIMING OF ATI SCANNING | TIMING OF ATI REFRESHING |
|---|---|---|---|
| G1 | RAID 0 | WHEN WRITING FREQUENCY REACHES SMALLEST THRESHOLD | WHEN ONE DISK DEVICE PROVIDES RESPONSE INDICATING THAT ATI REFRESHING IS TO BE EXECUTED |
| G2 | RAID 0+1<br>RAID 1<br>RAID 1+0<br>RAID5<br>RAID 5+0 | WHEN WRITING FREQUENCY REACHES SECOND SMALLEST THRESHOLD | WHEN TWO DISK DEVICES EACH PROVIDE RESPONSE INDICATING THAT ATI REFRESHING IS TO BE EXECUTED |
| G3 | RAID 6 | WHEN WRITING FREQUENCY REACHES THIRD SMALLEST THRESHOLD | WHEN THREE DISK DEVICES EACH PROVIDE RESPONSE INDICATING THAT ATI REFRESHING IS TO BE EXECUTED |

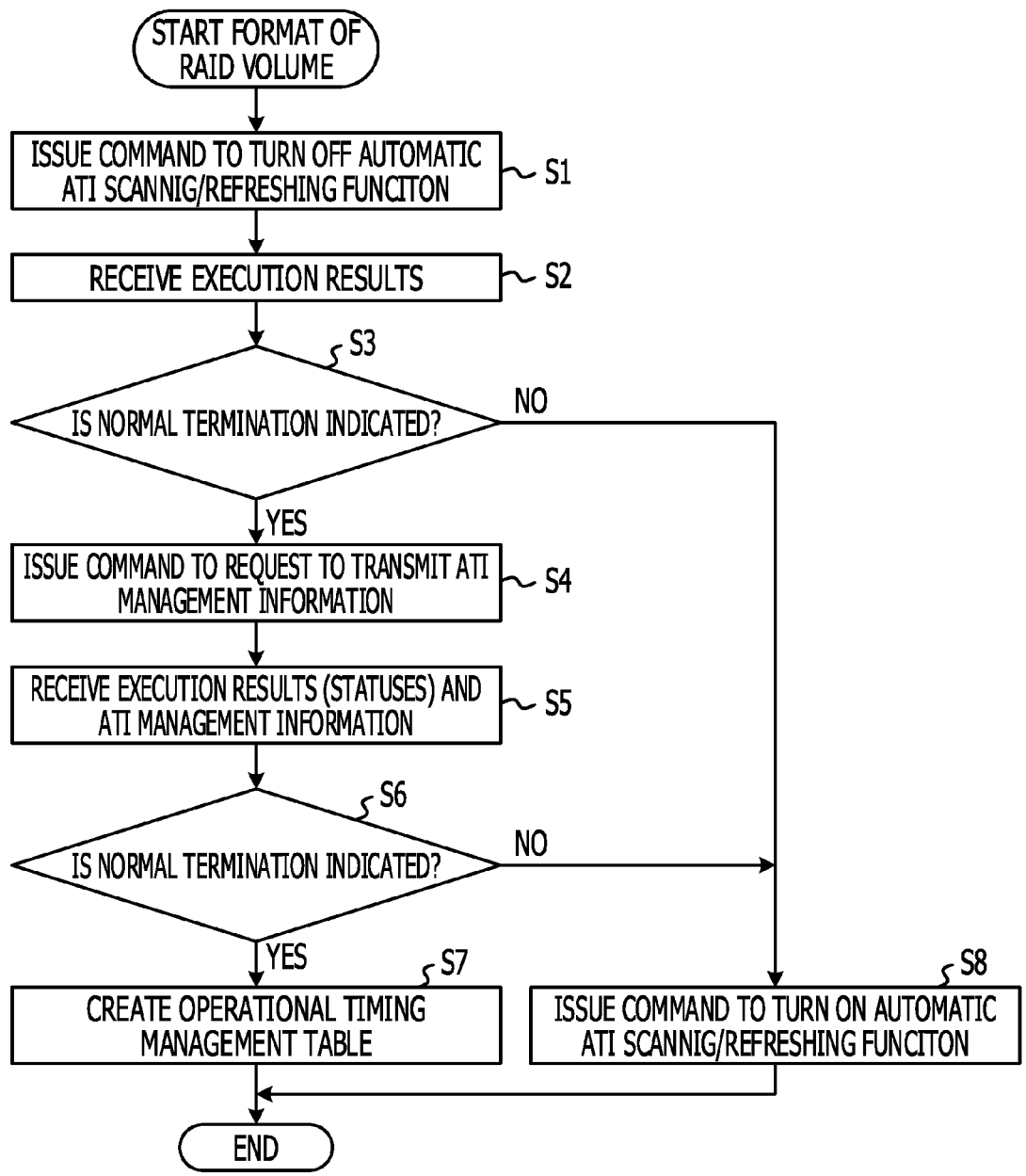

STORAGE CONTROL DEVICE AND STORAGE CONTROL METHOD

CROSS-REFERENCE TO RELATED APPLICATION

This application is based upon and claims the benefit of priority of the prior Japanese Patent Application No. 2013-074770 filed on Mar. 29, 2013, the entire contents of which are incorporated herein by reference.

FIELD

The embodiment discussed herein is related to a storage control device and a storage control method.

BACKGROUND

For a storage device, a technique of a redundant array of inexpensive disks (RAID) is used in which performance and failure tolerance is ensured by distributing data to multiple hard disks (magnetic disk devices). The storage device uses a RAID controller to achieve the technique of RAID such as arrangement of data in the disks, securement of redundancy (duplication) of the data.

In a disk device, adjacent track interference (ATI) may occur due to a high recording density. When the ATI occurs, writing of data into a certain sector may cause deletion of data stored in a data sector in an adjacent track due to leaking of a magnetic field for writing.

The disk device scans storage regions of the disk device in order to diagnose data affected by the ATI. If the data affected by the ATI is detected and to be recovered, the disk device rewrites the data affected by the ATI. As techniques for handling the ATI, there are the following techniques, for example.

As the first technique, there is a medium scanning method for causing a disk device to execute a process of writing information transmitted by a host device in a storage medium in response to a request from the host device. The medium scanning method causes the disk device to execute a medium monitoring process, a medium scanning determination process, and a medium scanning process. In the medium monitoring process, the disk device monitors the state of the storage medium in which the information has been written in the writing process. In the medium scanning determination process, the disk device determines, on the basis of the state of the storage medium, whether or not the storage medium is to be scanned. In the medium scanning process, the disk device scans the storage medium determined to be scanned in the medium scanning determination process.

As the second technique, there is a technique for efficiently inhibiting execution of unwanted refreshing. For the second technique, a magnetic disk device includes a grouping section and a refreshing controller. The grouping section classifies a group of tracks located on a disk into multiple groups each having multiple tracks including two or more tracks of which physical positions are not continuous. The refreshing controller controls, on a group basis, a refreshing process to be executed on the multiple groups.

As the third technique, there is an error state processing method for processing an error state of a large-capacity data storage device configured to store data on concentrically adjacent tracks of an electromagnetic storage medium. The error state processing method includes a process of detecting a state in which a track squeeze error is likely to occur during access to a specific region within the storage medium and a process of rewriting data on at least one track located closest to the specific region.

Related techniques are disclosed in, for example, Japanese Laid-open Patent Publication No. 2007-242207, Japanese Laid-open Patent Publication No. 2012-14790, and Japanese Laid-open Patent Publication No. 2005-322399.

If degraded data is detected as a result of scanning for diagnosing data affected by the ATI and degraded, and if the data is determined to be recovered, the disk device executes a process (data refreshing) of rewriting data. During the process, the disk device does not execute an input and output (I/O) process.

Thus, when the disk devices included in the storage device individually execute the scanning and the data refreshing, the I/O process may be delayed by the number of the disk devices. It is, therefore, desirable that the scanning is to be executed by the disk devices at the same time and the data refreshing is to be executed by the disk devices at the same time.

SUMMARY

According to an aspect of the present invention, provided is a storage control device including a processor. The processor is configured to request a plurality of disk devices storing data therein to notify the processor of degradation information on degradation of data stored in the respective disk devices. The processor is configured to instruct, based on first information among notified degradation information, the plurality of disk devices to rewrite data. The first information serves as a trigger of rewriting data. The first information is notified by at least one of the plurality of disk devices.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating the timing of ATI scanning and the timing of ATI refreshing in accordance with RAID levels;

FIG. 5 illustrates an example of the flow of a process of creating the operational timing management table when a RAID volume is created for reconfiguration of a RAID group.

DESCRIPTION OF EMBODIMENT

A disk device handles the ATI using a scanning (hereinafter referred to as ATI scanning) function for the ATI and a data refreshing (hereinafter referred to as ATI refreshing) function for the ATI. The ATI scanning function is a function that is activated when the number (writing frequency) of writing in a management region exceeds a threshold and that diagnoses a data deletion state. The ATI refreshing function is a function that rewrites data of the management region if the ATI scanning function diagnoses that the amount of a deleted part of data exceeds a threshold.

The timing of activating the ATI scanning function and the timing of activating the ATI refreshing function depend on thresholds held by the disk device, and the ATI scanning and the ATI refreshing are forcibly executed.

Thus, in a storage device that executes I/O access to the same locations (LBA: logical block addressing) of multiple disk devices, the disk devices included in the storage device may asynchronously execute the ATI scanning and the ATI refreshing. If all the disk devices that form a RAID asynchronously execute the ATI scanning and the ATI refreshing, an I/O process may be delayed by the number of the disk devices.

Therefore, a RAID controller issues a command to the disk devices through an interface (I/F) and causes the disk devices included in the RAID to synchronously execute the ATI scanning and the ATI refreshing.

Figure 1:
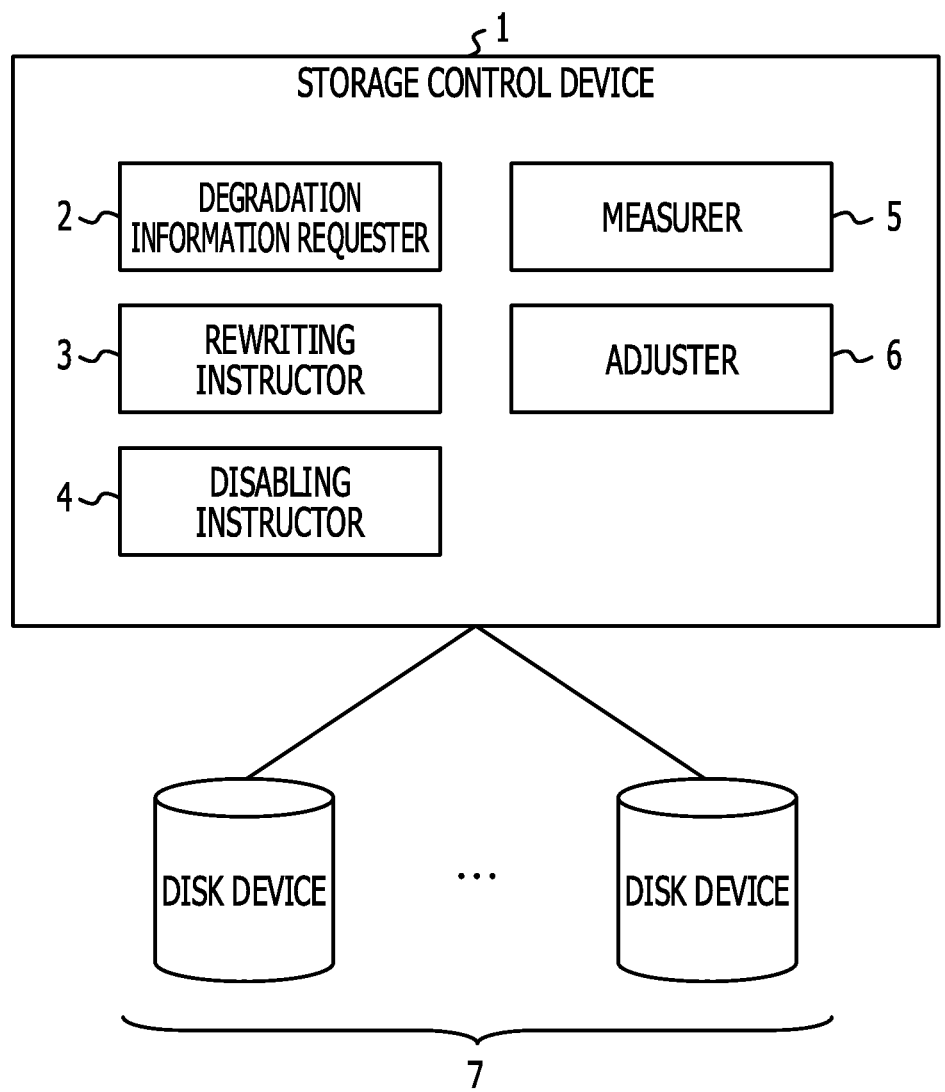
FIG. 1 illustrates an example of a storage control device according to the embodiment.

FIG. 1 illustrates an example of a storage control device according to the embodiment. The storage control device 1 includes a degradation information requester 2 and a rewriting instructor 3.

The degradation information requester 2 requests a plurality of disk devices 7 storing data to notify the degradation information requester 2 of degradation information on degradation of the stored data. An example of the degradation information requester 2 is an ATI scanning instructor 132 (refer to FIG. 2).

The rewriting instructor 3 instructs the plurality of disk devices 7 to rewrite data on the basis of degradation information, among the degradation information notified by the plurality of disk devices 7, which has been notified by one or more of the disk devices 7 and serves as a trigger of rewriting data. An example of the rewriting instructor 3 is an ATI refreshing instructor 133 (refer to FIG. 2).

By configuring the storage control device 1 in the aforementioned manner, the disk devices 7 may synchronously execute a process of rewriting data for degradation of the data stored in the disk devices 7.

The plurality of disk devices 7 each have a determination function of independently making a determination about degradation of data and a rewriting function of independently rewriting data on the basis of a determination result. The storage control device 1 further includes a disabling instructor 4. The disabling instructor 4 instructs the plurality of disk devices 7 to disable the rewriting function. The rewriting function is a function of independently rewriting data if the data has been determined to be rewritten due to the degradation in accordance with the result of determination about degradation of data. An example of the disabling instructor 4 is a switching instructor 134 (refer to FIG. 2). The degradation information requester 2 requests the plurality of the disk devices 7 to notify the degradation information requester 2 of the degradation information when the degradation information requester 2 confirms that the rewriting functions of the disk devices 7 have been disabled in accordance with the instruction to disable the rewriting function.

Since the storage control device 1 is configured in the aforementioned manner, the storage control device 1 may stop the rewriting independently executed by the disk devices 7 and centrally manage the timing of the rewriting process.

The storage control device 1 further includes a measurer 5. The measurer 5 measures the number (writing frequency) of times the writing process of writing data in the plurality of disk devices 7 is executed. An example of the measurer 5 is a counter updating section 135 (refer to FIG. 2). If the measured writing frequency exceeds a first threshold, the degradation information requester 2 requests the plurality of disk devices 7 to notify the degradation information requester 2 of the degradation information. The rewriting instructor 3 instructs the plurality of disk devices 7 to rewrite data on the basis of degradation information that serves as a trigger of rewriting data and has been notified by disk devices 7 of which the number is equal to or larger than a second threshold.

The first threshold and the second threshold are set on the basis of a type (RAID level) of a RAID group formed by the disk devices. An example of the first threshold is a threshold T1 (described later) according to the embodiment. An example of the second threshold is a threshold T2 (described later) according to the embodiment. Since the first threshold and the second threshold are selected on the basis of the type of the RAID group, the timing of the ATI scanning and the timing of the ATI refreshing may be adjusted on the basis of the type of the RAID group.

The storage control device 1 further includes an adjuster 6. The adjuster 6 adjusts, on the basis of the writing frequency, a frequency at which a process of detecting degradation of the data stored in the disk devices 7 is executed. An example of the adjuster 6 is a scanning frequency adjuster 136 (refer to FIG. 2).

Since the storage control device 1 is configured in the aforementioned manner, the storage control device 1 may use a reset value as a new threshold T1 to reduce the frequency of the ATI scanning and may reduce an impact, caused by the execution of the ATI scanning, on performance.

Hereinafter, details of the embodiment are described.

Figure 2:
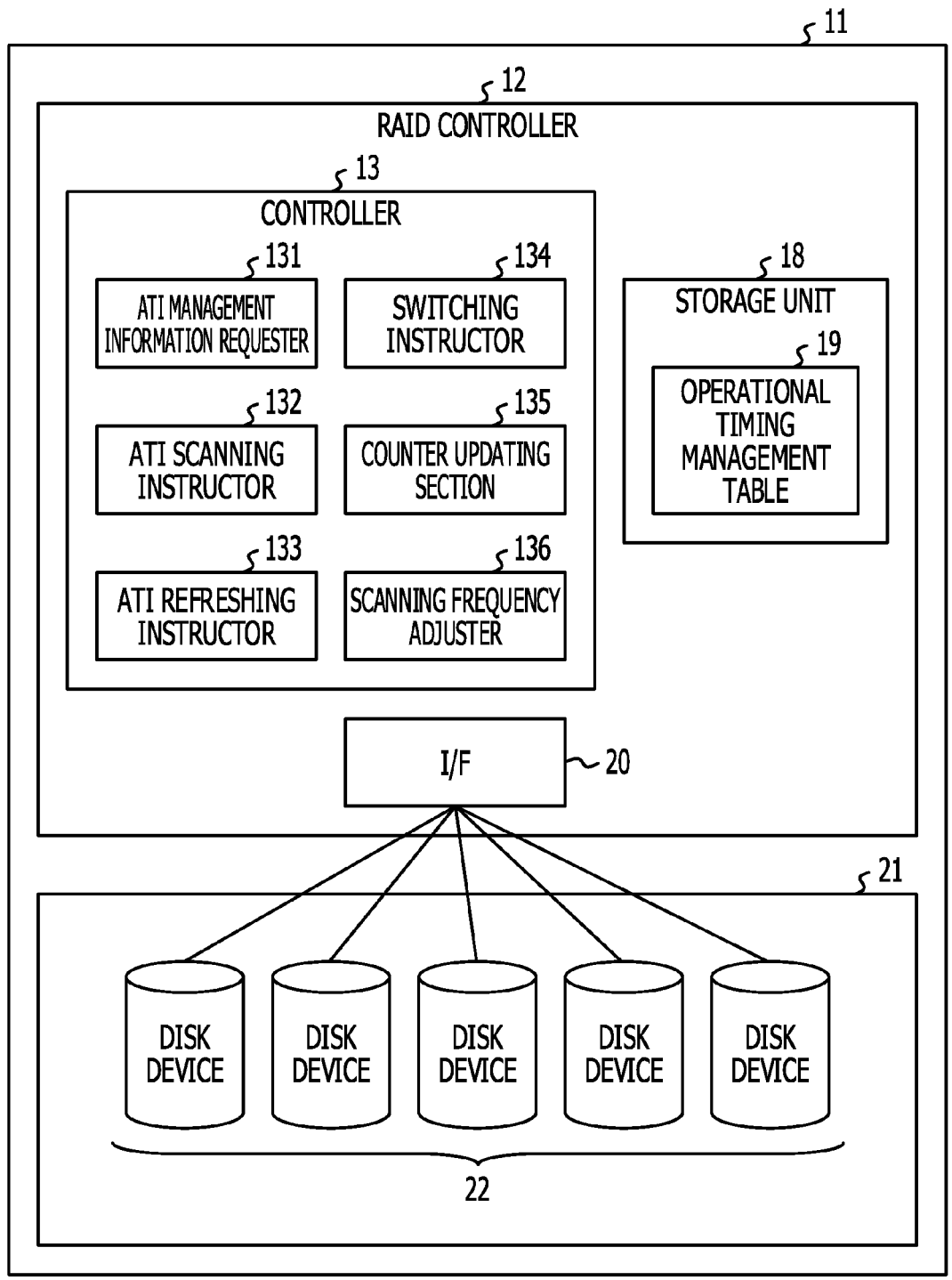
FIG. 2 illustrates an example of a storage device according to the embodiment.

FIG. 2 illustrates an example of a storage device according to the embodiment. The storage device 11 includes a RAID controller 12 and a RAID group 21. The RAID group 21 includes a plurality of disk devices 22 that form a RAID.

The RAID controller 12 manages the RAID group 21 formed by the plurality of disk devices 22 and the like. The RAID controller 12 includes a controller 13, a storage unit 18, and an interface (I/F) 20.

The storage unit 18 is a device configured to store therein information and is, for example, a cache memory, a read-only memory (ROM), a random access memory (RAM), or the like. The storage unit 18 has an operational timing management table 19 stored therein.

The controller 13 is a processor that is an integrated circuit such as an application specific integrated circuit (ASIC) or a field programmable gate array (FPGA) or an electronic circuit such as a central processing unit (CPU) or a micro processing unit (MPU), for example. The controller 13 functions as an ATI management information requester 131, the ATI scanning instructor 132, the ATI refreshing instructor 133, the switching instructor 134, the counter updating section 135, and the scanning frequency adjuster 136.

The ATI management information requester 131 issues a command (ATI management information request command) to request the disk devices 22 to transmit ATI management information in response to receiving, from the disk devices 22, notifications indicating completion of preparation after the activation of the disk devices 22. The ATI management information includes LBA range information corresponding to storage regions (management regions) for which the ATI is managed, threshold information indicating a threshold for the writing frequency and to be used to execute the ATI scanning, and the writing frequency. The ATI management information requester 131 creates the operational timing management table 19 using the ATI management information acquired from the disk devices 22 as a result of the execution of the ATI management information request command.

The ATI scanning instructor 132 issues, on the basis of the operational timing management table 19, a command (ATI scan command) to activate ATI scanning operations to the disk devices 22.

The ATI refreshing instructor 133 determines, on the basis of a result of the ATI scanning and a RAID level of the RAID formed by the disk devices 22, whether or not the ATI refreshing is to be executed. If the ATI refreshing instructor 133 determines that the ATI refreshing is to be executed, the ATI refreshing instructor 133 issues a command (ATI refresh command) to activate ATI refreshing operations to the disk devices 22.

The switching instructor 134 issues commands (switch commands) to enable (turn on) and disable (turn off) functions of the disk devices 22 for automatically executing the ATI scanning operations and the ATI refreshing operations.

The counter updating section 135 measures the writing frequency and updates the operational timing management table 19 with the measured writing frequency.

The scanning frequency adjuster 136 adjusts a frequency at which the ATI scanning is executed in order to make the timing of the ATI scanning appropriate.

The interface 20 is connected to the disk devices 22 and transfers data between the controller 13 and the disk devices 22.

The disk devices 22 turn on and off the function (automatic ATI scanning/refreshing function) of automatically executing the ATI scanning and the ATI refreshing in accordance with the switch command received from the RAID controller 12 through the interface 20. The ATI scanning and the ATI refreshing are internal processes of the disk devices 22. The disk devices 22 transmit the ATI management information in response to the issuance of the ATI management information request command by the RAID controller 12. The disk devices 22 execute the ATI scanning in response to the issuance of the ATI scan command by the RAID controller 12 and execute the ATI refreshing in response to the issuance of the ATI refresh command by the RAID controller 12.

Figure 3:
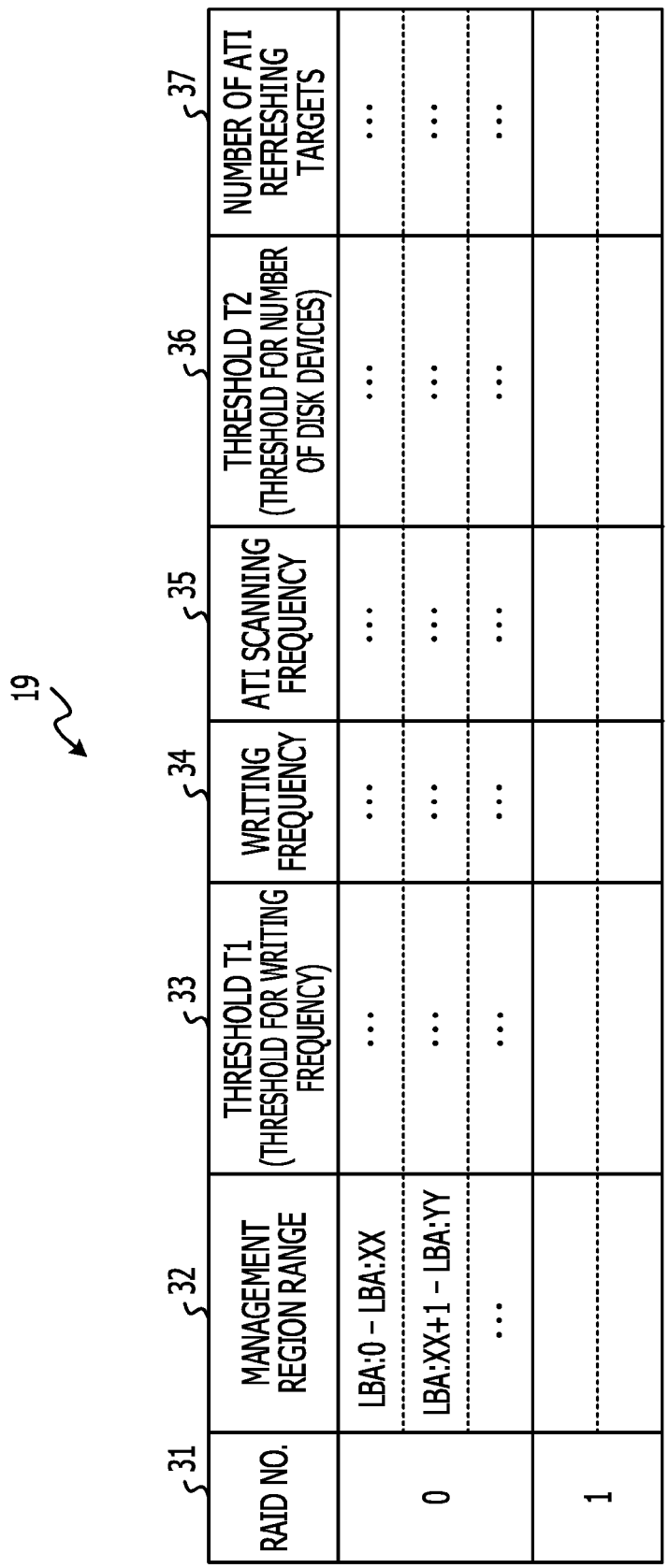
FIG. 3 illustrates an example of an operational timing management table according to the embodiment.

FIG. 3 illustrates an example of the operational timing management table according to the embodiment. The ATI management information requester 131 creates the operational timing management table 19 including the following data items for each RAID level by issuing the ATI management information request command.

The operational timing management table 19 includes the data items of a "RAID No." 31, a "management region range" 32, a "threshold T1" 33, a "writing frequency" 34, an "ATI scanning frequency" 35, a "threshold T2" 36, and the "number of ATI refreshing targets" 37.

The "RAID No." 31 indicates information that identifies a RAID. The "management region range" 32 indicates a range of a region that is managed by the disk devices 22 and in which the ATI scanning is executed. The "threshold T1" 33 indicates a threshold of the writing frequency for execution of the ATI scanning. The "writing frequency" 34 indicates the number of times the writing process is executed. The "ATI scanning frequency" 35 indicates the number of times the ATI scan command is executed. The "threshold T2" 36 indicates a threshold of the number of disk devices 22 for execution of the ATI refreshing. The "number of ATI refreshing targets" 37 indicates the number of the disk devices 22 on which the ATI refreshing is to be executed.

Values of the "threshold T1" 33 and the "threshold T2" 36 are set in advance. The "threshold T1" 33, however, is reset on the basis of the actual scanning frequency.

Next, a method for controlling the ATI scanning and the ATI refreshing is described. As described below with reference to FIG. 4, the timing of the ATI scanning and the timing of the ATI refreshing may be classified into three groups in accordance with RAID levels. Configurations of the RAID may be classified into multiple types on the basis of a method for generating and arranging redundant data. The RAID levels are values indicating the classified definitions and are represented by RAID0, RAID0+1, RAID1, RAID1+0, RAID5, RAID6, and the like.

FIG. 4 is a diagram illustrating the timing of the ATI scanning and the timing of the ATI refreshing in accordance with the RAID levels. The timing of the ATI scanning and the timing of the ATI refreshing are classified into groups G1 to G3 in accordance with the RAID levels. The RAID level "RAID0" is included in the group G1. The RAID levels "RAID0+1", "RAID1", "RAID1+0", "RAID5", and "RAID5+0" are included in the group G2. The RAID level "RAID6" is included in the group G3. The configurations of the RAID group are classified into the three groups in accordance with the RAID levels in consideration of two points, redundancy and a small impact (a low frequency of the ATI scanning and the ATI refreshing) on the performance in the RAID, due to the execution of the ATI scanning and ATI refreshing.

A failure of one disk device included in a RAID corresponding to the group G1 leads to a RAID failure. Failures of two disk devices included in a RAID corresponding to the group G2 lead to a RAID failure. Failures of three disk devices included in a RAID corresponding to the group G3 lead to a RAID failure.

First, the case where the RAID level of the storage device 11 corresponds to the group G1 is described below. When the writing frequency reaches the smallest threshold T1 among thresholds T1 held by the disk devices 22, the ATI scanning is executed. In addition, when one of the disk devices 22 included in the RAID provides a response indicating that the ATI refreshing is to be executed, the ATI refreshing is executed.

The case where the RAID level of the storage device 11 corresponds to the group G2 is described below. When the writing frequency reaches the second smallest threshold T1 among the thresholds T1 held by the disk devices 22, the ATI scanning is executed. In addition, when two of the disk devices 22 included in the RAID each provide a response indicating that the ATI refreshing is to be executed, the ATI refreshing is executed.

The case where the RAID level of the storage device 11 corresponds to the group G3 is described below. When the writing frequency reaches the third smallest threshold T1 among the thresholds T1 held by the disk devices 22, the ATI scanning is executed. In addition, when three of the disk devices 22 included in the RAID each provide a response indicating that the ATI refreshing is to be executed, the ATI refreshing is executed.

Next, a method for learning the timing of the ATI scanning is described.

The threshold T1 is reset at the timing of resetting a threshold for the ATI scanning.

The timing of resetting a threshold for the ATI scanning is the time to execute the ATI refreshing after the ATI scanning is executed three times or more. Specifically, for example, it is determined to be the timing of resetting a threshold for the ATI scanning if the ATI scanning frequency satisfies the following conditional expression (1) when it is time to execute the ATI scanning.

$$\text{The ATI scanning frequency up to the time to execute the ATI scanning} \geq 3 \quad (1)$$

If the ATI scanning frequency satisfies the conditional expression (1) when it is time to execute the ATI scanning, the threshold T1 of the writing frequency for the execution of the ATI scanning is reset using the following expression (2).

$$\text{The reset value} = (\text{the ATI scanning frequency up to the time to execute the ATI refreshing}) \times (\text{the current threshold } T1)/2 \qquad (2)$$

By using the reset value as a new threshold T1, the ATI scanning frequency may be reduced and an impact on the performance due to the execution of the ATI scanning may be reduced.

Operations of the storage device 11 according to the embodiment are mainly classified into two processes, a process of creating the operational timing management table 19 when a RAID volume is created for reconfiguration of a RAID group and an ATI scanning and refreshing process to be executed by the RAID controller 12. The processes are described in detail with reference to FIGS. 5 and 6. The RAID group is reconfigured by changing (replacing, for example) a disk device 22 included in the RAID group 21. The RAID volume is one or more RAID-based logical volumes of storage regions included in the disk devices 22.

Next, the flows of the processes executed by the RAID controller 12 according to the embodiment are described with reference to FIGS. 5 and 6. For the processes, the controller 13 of the RAID controller 12 functions as the ATI management information requester 131, the ATI scanning instructor 132, the ATI refreshing instructor 133, the switching instructor 134, the counter updating section 135, and the scanning frequency adjuster 136.

FIG. 5 illustrates an example of the flow of the process of creating the operational timing management table when a RAID volume is created for reconfiguration of a RAID group according to the embodiment. When creating the RAID volume, the storage device 11 executes the following operations so as to create the operational timing management table 19.

First, the switching instructor 134 issues, to the disk devices 22, a command to turn off the automatic ATI scanning/refreshing function (in S1). Upon receiving the command to turn off the automatic ATI scanning/refreshing function, each disk device 22 executes the command and responds to the RAID controller 12 with the result (status indicating normal termination or abnormal termination) of the execution.

The switching instructor 134 receives, from all the disk devices 22 included in the RAID group 21, the results (response results) of the execution of the command to turn off the automatic ATI scanning/refreshing function (in S2).

If the result received from any of the disk devices 22 indicates the abnormal termination in ("No" in S3), the switching instructor 134 executes the following operation. That is, the switching instructor 134 issues, to the disk devices 22, a command to turn on the automatic ATI scanning/refreshing function (in S8). The switching instructor 134 may issue the command to turn on the automatic ATI scanning/refreshing function to the disk device 22 that has provided the result indicating abnormal termination. Upon receiving the command to turn on the automatic ATI scanning/refreshing function, the disk devices 22 execute the automatic ATI scanning and the automatic ATI refreshing.

If the results received from all the disk devices 22 included in the RAID group 21 indicate the normal termination ("Yes" in S3), the switching instructor 134 determines that the automatic ATI scanning/refreshing function are in OFF states. In this case, the ATI management information requester 131 issues, to the disk devices 22, the command (ATI management information request command) to request the disk devices 22 to transmit the ATI management information (in S4).

Upon receiving the ATI management information request command, each disk device 22 executes the ATI management information request command. Each disk device 22 responds to the RAID controller 12 with the ATI management information and the result (status indicating normal termination or abnormal termination) of the execution of the ATI management information request command. The ATI management information requester 131 receives, from each disk device 22, the ATI management information and the result (status) of the execution of the ATI management information request command (in S5).

If any of the results of the execution of the ATI management information request command indicates abnormal termination ("No" in S6), the switching instructor 134 issues, to the disk devices 22, the command to turn on the automatic ATI scanning/refreshing function (in S8). Upon receiving the command to turn on the automatic ATI scanning/refreshing function, the disk devices 22 execute the command and turn on the automatic ATI scanning/refreshing function. Then, the disk devices 22 execute the automatic ATI scanning and the automatic ATI refreshing.

If all the results of the execution of the ATI management information request command indicate the normal termination ("Yes" in S6), the ATI management information requester 131 creates the operational timing management table 19 by using the received ATI management information (in S7).

When the RAID group 21 is reconfigured, the RAID controller 12 executes S1 to S7 on the disk device 22 newly added to the RAID group 21 and updates the operational timing management table 19.

Thus, the operational timing management table 19 is created and the RAID controller 12 may identify a type (RAID level) of the RAID group 21 by referencing the operational timing management table 19.

Figure 6:
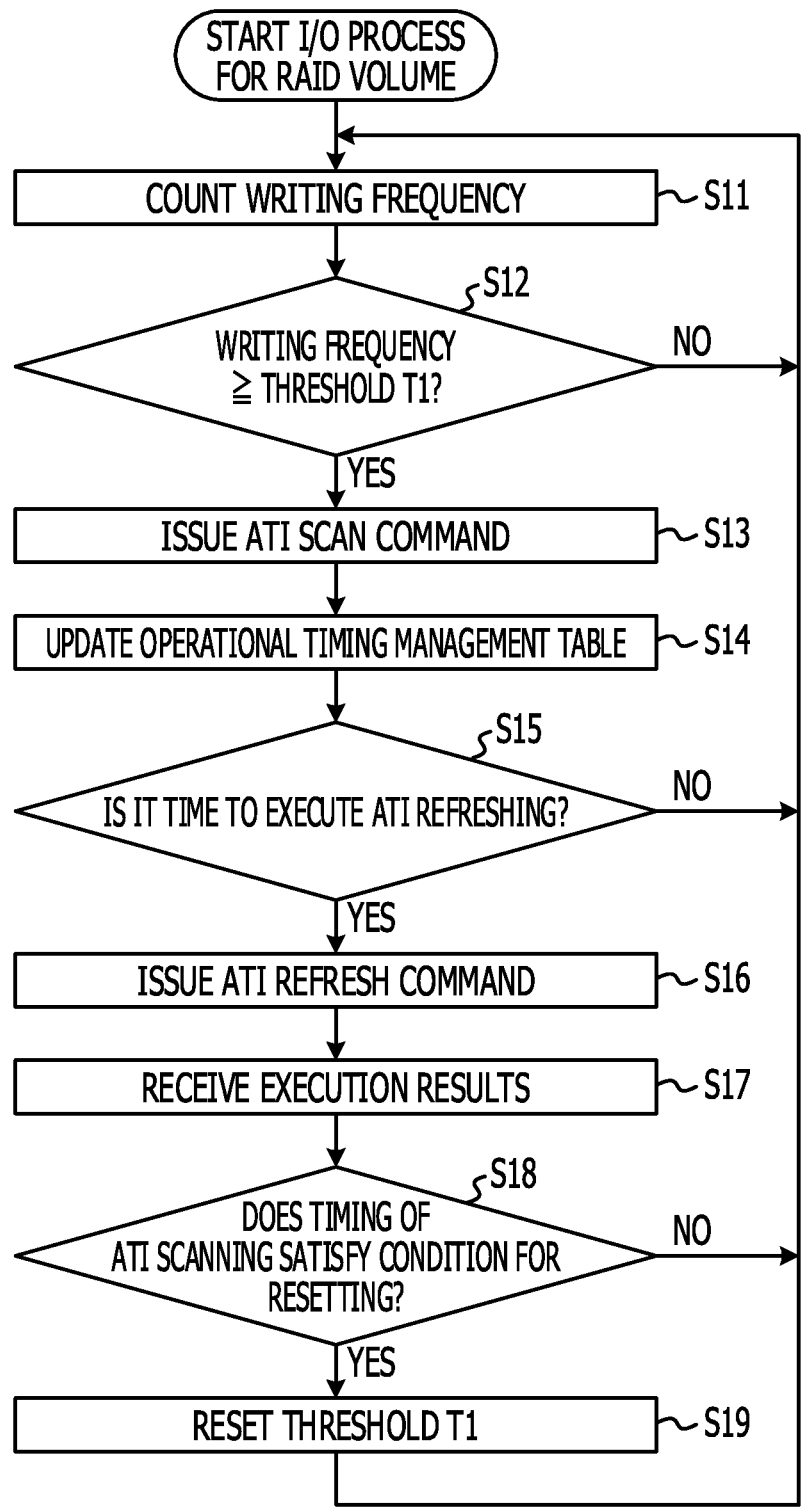
FIG. 6 illustrates an example of the flow of an ATI scanning and ATI refreshing process to be executed by a RAID controller.

FIG. 6 illustrates an example of the flow of the ATI scanning and ATI refreshing process to be executed by the RAID controller. The RAID controller 12 identifies a type (RAID level) of the RAID group 21 by referencing the operational timing management table 19 created in accordance with the flow illustrated in FIG. 5. The RAID controller 12 selects, as described with reference to FIG. 4, a disk device 22 on the basis of the RAID level and sets a threshold T1 of the selected disk device 22.

The counter updating section 135 counts the number of times of the writing process executed in an I/O process of the selected disk device 22 and updates the "writing frequency" 34 of the operational timing management table 19 (in S11). The counter updating section 135 determines whether or not the counted writing frequency reaches the threshold T1 (in S12). If the counted writing frequency does not reach the threshold T1 ("No" in S12), the process returns to S11.

If the counted writing frequency reaches the threshold T1 ("Yes" in S12), the ATI scanning instructor 132 issues the ATI scan command to all the disk devices 22 that form the RAID group 21 (in S13). Upon receiving the ATI scan command, the disk devices 22 execute the ATI scanning and diagnose data deletion states. The disk devices 22 respond to the RAID controller 12 with results (information items indicating whether or not the amount of a deleted part of data exceeds a threshold, the ATI scanning frequency, and the like) of the execution of the ATI scan command.

The ATI scanning instructor 132 receives the results of the execution of the ATI scan command from all the disk devices 22. The ATI scanning instructor 132 updates the "ATI scanning frequency" 35 and "number of ATI refreshing targets" 37 of the operational timing management table 19 on the basis of the results of the execution of the ATI scan command (in S14).

As described with reference to FIG. 4, the ATI refreshing instructor 133 determines whether or not it is time to execute the ATI refreshing for the RAID level of the RAID group 21 (in S15). Specifically, the ATI refreshing instructor 133 determines whether or not the "number of ATI refreshing targets" 37 of the operational timing management table 19 is equal to or larger than the threshold T2.

If it is not yet time to execute the ATI refreshing ("No" in S15), the process returns to S11.

If it is time to execute the ATI refreshing ("Yes" in S15), the ATI refreshing instructor 133 issues the ATI refresh command to all the disk devices 22 included in the RAID group 21 (in S16). Upon receiving the ATI refresh command, the disk devices 22 execute the ATI refresh command and rewrite data corresponding to the "management region range" 32 of the operational timing management table 19. The disk devices 22 respond to the RAID controller 12 with results of the execution of the ATI refresh command.

The ATI refreshing instructor 133 receives the results of the execution of the ATI refresh command from all the disk devices 22 (in S17).

If the timing of the ATI scanning satisfies the conditional expression (1) for resetting the timing of the ATI scanning ("Yes" in S18), the scanning frequency adjuster 136 resets the timing of the ATI scanning in accordance with expression (2) (in S19). If the timing of the ATI scanning does not satisfy conditional expression (1) for resetting the timing of the ATI scanning ("No" in S18), the process returns to S11.

According to the embodiment, the RAID controller may control the ATI refreshing operations of all the disk devices included in the RAID group so as to cause the ATI refreshing operations to be synchronously executed in order to minimize degradation of the performance caused by the ATI refreshing operations autonomously executed by the disk devices. In this case, the RAID controller may control the ATI refreshing so as to be executed at an appropriate time.

Embodiments are not limited to the aforementioned embodiment and various embodiments may be configured in various manners other than the aforementioned embodiment without departing from the gist of the disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device comprising:
a processor configured to:
request a plurality of disk devices storing data therein to notify the processor of degradation information on degradation of data stored in the respective disk devices;
instruct, based on first information among notified degradation information, the plurality of disk devices to rewrite data, the first information serving as a trigger of rewriting data, the first information being notified by at least one of the plurality of disk devices; and
instruct the plurality of disk devices to disable automatic rewriting functions of independently rewriting first data if the first data has been determined to be rewritten due to degradation.

2. The storage control device according to claim 1, wherein the processor is configured to
request, when the processor confirms that automatic rewriting functions of the plurality of disk devices have been disabled, the plurality of disk devices to notify the processor of the degradation information.

3. The storage control device according to claim 1, wherein the processor is configured to
measure a writing frequency of writing data in the plurality of disk devices, and
request the plurality of disk devices to notify the processor of the degradation information if the measured writing frequency is equal to or larger than a predetermined threshold.

4. The storage control device according to claim 3, wherein the predetermined threshold is set based on a type of a redundant array of inexpensive disks (RAID) group formed by the plurality of disk devices.

5. The storage control device according to claim 3, wherein the processor is further configured to
adjust, based on the measured writing frequency, a frequency of requesting the plurality of disk devices to notify the processor of the degradation information.

6. The storage control device according to claim 1, wherein the processor is configured to
instruct, if the first information is notified by a first number of disk devices, the plurality of disk devices to rewrite data, the first number being equal to or larger than a predetermined threshold.

7. The storage control device according to claim 6, wherein the predetermined threshold is set based on a type of a redundant array of inexpensive disks (RAID) group formed by the plurality of disk devices.

8. A non-transitory computer-readable recording medium having stored therein a program for causing a computer to execute a process, the process comprising:
requesting a plurality of disk devices storing data therein to notify the computer of degradation information on degradation of data stored in the respective disk devices;
instructing, based on first information among notified degradation information, the plurality of disk devices to rewrite data, the first information serving as a trigger of rewriting data, the first information being notified by at least one of the plurality of disk devices; and
instructing the plurality of disk devices to disable automatic rewriting functions of independently rewriting first data if the first data has been determined to be rewritten due to degradation.

9. A storage control method, comprising:
requesting, by a computer, a plurality of disk devices storing data therein to notify the computer of degradation information on degradation of data stored in the respective disk devices;
instructing, based on first information among notified degradation information, the plurality of disk devices to rewrite data, the first information serving as a trigger of rewriting data, the first information being notified by at least one of the plurality of disk devices; and
instructing the plurality of disk devices to disable automatic rewriting functions of independently rewriting first data if the first data has been determined to be rewritten due to degradation.

10. The storage control method according to claim 9, wherein the requesting is performed when the computer confirms that automatic rewriting functions of the plurality of disk devices have been disabled.

11. The storage control method according to claim 9, further comprising:
   measuring a writing frequency of writing data in the plurality of disk devices,
   wherein the requesting is performed if the measured writing frequency is equal to or larger than a predetermined threshold.

12. The storage control method according to claim 11, wherein the predetermined threshold is set based on a type of a redundant array of inexpensive disks (RAID) group formed by the plurality of disk devices.

13. The storage control method according to claim 11, further comprising:
   adjusting, based on the measured writing frequency, a frequency of requesting the plurality of disk devices to notify the computer of the degradation information.

14. The storage control method according to claim 9, wherein the instructing to rewrite data if the first information is notified by a first number of disk devices, the first number being equal to or larger than a predetermined threshold.

15. The storage control method according to claim 14, wherein the predetermined threshold is set based on a type of a redundant array of inexpensive disks (RAID) group formed by the plurality of disk devices.

* * * * *